United States Patent [19]

Singh

[11] 4,137,110

[45] Jan. 30, 1979

[54] METHOD OF MAKING LAMINATED INSOLES

[75] Inventor: Tej K. Singh, Baildon, England

[73] Assignee: Associated Paper Industries Limited, London, England

[21] Appl. No.: 817,000

[22] Filed: Jul. 19, 1977

[30] Foreign Application Priority Data

Jul. 27, 1976 [GB] United Kingdom ............... 31183/76

[51] Int. Cl.$^2$ .................... B32B 5/32; A43B 13/38
[52] U.S. Cl. ........................................ 156/62.2; 36/44;
156/279; 427/202; 427/243; 427/407 R;
428/244; 428/281; 428/290; 428/306; 428/408
[58] Field of Search .................. 156/62.2, 62.6, 276,
156/279, 296; 36/43, 44; 128/290 W, 290 P;
264/109, 113; 427/243, 244, 407, 411, 412, 203,
202; 428/306, 244, 317, 281, 290, 408, 283

[56] References Cited

U.S. PATENT DOCUMENTS

| | | | |
|---|---|---|---|
| 2,254,711 | 9/1941 | Schur et al. | 36/44 |
| 2,501,988 | 3/1950 | Buffington | 427/243 |
| 3,382,090 | 5/1968 | Meisel et al. | 427/244 |
| 3,852,897 | 12/1974 | Bridge et al. | 36/44 |
| 3,939,836 | 2/1976 | Tune | 128/290 W |

OTHER PUBLICATIONS

Kirk–Othmer, Encyclopedia of Chemical Technology, 2nd Ed., Table 42, p. 578.

*Primary Examiner*—Michael W. Ball
*Attorney, Agent, or Firm*—Beveridge, DeGrandi, Kline & Lunsford

[57] ABSTRACT

Air permeable wear-resistant insoles are produced by forming a web or matt of fibres loaded with active carbon onto a wear-resistant fabric, impregnating the web or matt of fibres with a latex binder and effecting migration of the binder from the interior of the web or matt to the surfaces thereof and curing the binder to form an air permeable insole. The web or matt is then further impregnated by coating the outer surface of the wear-resistant fabric section of the insole with latex binder which contains sufficient wetting agent to effect penetration of the latex binder through the wear-resistant fabric and into the surface of the web or matt attached thereto and the binder is cured.

5 Claims, No Drawings

METHOD OF MAKING LAMINATED INSOLES

The present invention relates to insoles for footwear and in particular to such insole which reduces odors which sometimes occur due to feet perspiring.

The provision of an insole which will effectively reduce or remove odors caused by perspiring feet, which has a reasonable active life and which will stand up to normal wear and tear was for many years a problem which remained unsolved.

Insoles composed of felt impregnated with various medicaments for the suppression of putrification of perspiration excreted from the feet of the wearer have been proposed. In one case the felt was impregnated with a liquid containing the medicament and in another pockets were provided in the surface of the felt which pockets contained various medicaments or deodorants. None of these has however been successful in practice either due to the ineffectiveness of the medicament or to the short active life thereof or both. Furthermore the repeated and prolonged use of certain chemicals (e.g. deodorants) can give rise to allergic effects either to the chemical or its carrier agent.

It has also been proposed to use active carbon granules disposed between two or more sheets of fabric. Such insoles however do not stand up to normal wear and tear if the granules are not fixed by means of some form of adhesive, but when adhesives were used it was found that the activity of the carbon was lost due to poisoning of the carbon by the adhesive or to a lowering of the permeability of the insole below the level at which the active carbon could effectively act.

The obvious expedient seemed to be the production of a web or matt containing active carbon and effecting impregnation of the matt with a binder only at the surfaces of the matt or web so as to avoid contamination of the carbon. This however was found ineffective since the resistance to wear and tear was found to be very low.

The problem was finally solved for the majority of sufferers when it was found that when such a fibrous matt or web containing active carbon was impregnated throughout its thickness with a latex binder and then migration of the binder from its interior to the surfaces of the web was effected, contrary to expectation the activity of the active carbon remained at an effective level and the strength of the insole was sufficient to withstand ordinary wear and tear. Such insoles are described and claimed in U.S. Pat. No. 3,852,897.

It has not been found however, that whilst the insoles of U.S. Pat. No. 3,852,897 are satisfactory for the majority of sufferers from perspiring feet, many cases do exist in which the level of excretion of perspiration is so great that the wearing properties of even the insoles of said U.S. patent are not sufficient and break down of the insole can occur in a few days, or in some extreme cases even in a few hours.

Attempts to increase the wear resistance of such insoles by using wear resistant fabrics such as woven nylon as the top surface of the insoles of the said U.S. patent were not successful since the amount of latex required at the surface to adequately bond such fabrics was too great to be acheived by the migration process of that patent. The use of additional latex on the surface after formation of the web was also unsuccessful since the permeability of the web was then lowered to a point where it failed to acheive its object in use.

In the process of U.S. Pat. No. 3,852,897 the web is impregnated with of the order of 200% by weight of liquid impregnant based on the dry weight of the web. Even when a second impregnation through the wear-resistant screen was reduced to 25-35% by weight of liquid impregnant this second application was found invariably to block the pores of the insole and lower permeability to a useless level.

It has now been surprisingly found that if a small amount of a wetting agent (e.g. of the order of 0.2% by weight of the liquid impregnant) is incorporated into the liquid impregnant used for the second impregnation the effect is to increase the penetration of the impregnant without materially affecting the permeability of the final product whilst providing a good bond of the wear resistant layer to the insole.

According to the present invention a method is provided of producing an air permeable wear-resistant insole which comprises forming a web or matt of fibres loaded with active carbon by an air-laying method onto a wear-resistant fabric, effecting a first impregnation of said web or matt of fibres with a latex binder and effecting migration of said binder from the interior of said web or matt to the surfaces thereof and curing said binder by the application of heat whereby to form an air permeable insole effecting a second impregnation by coating the outer surface of the wear-resistant fabric section of said insole with latex binder which contains sufficient wetting agent to effect penetration of said latex binder through said wear-resistant fabric and into the surface of the web or matt attached thereto and curing the said binder by the application of heat.

The amount of retained binder following the first impregnation may be of the order of 20% by weight based on the dry weight of the loaded web and wear-resistant fabric. The retained binder due to the second impregnation should not in general be more than about 5% by weight based on the dry weight of the finished insole.

The binder used for the first impregnation is preferably an acrylic latex having a content of about 4% by weight of a melamine/formaldehyde solution as wet-strength agent. Other wet-strength agents compatible with an acrylic latex may also be used.

The binder used for the second impregnation may be that used for the first impregnation except that it contains in addition sufficient wetting agent to effect penetration of the latex through the wear-resistant fabric into the surface of the web. The wetting agent may be any surface active agent compatible with the binder and which does not leave a deleterious effect on the insole. Excess wetting agent should be avoided since this can affect the wettability of the final product. The optimum amount required will vary according to the wetting agent used. In the case of nonionic multipurpose wetting agents such as Hyonic PE90 (sold by Diamond Shamrock Ltd) about 0.2% by weight based on the weight of binder is generally sufficient for the purpose of the method of the invention.

Curing the bonding agent is effected in the usual way, a temperature of about 130° C being satisfactory in most cases of acrylic resins.

EXAMPLE

A web of active carbon and wood pulp was deposited at 5 f.p.m. on to a warp knitted, BNS, high heat set nylon fabric aof 44 denier and a wegith of 2 1/2 oz./sq. yard by the method described in U.S. Pat. No.

3,852,897. The resulting composite web of active carbon/fibre backed by the nylon was impregnated with a binder consisting of a 10% solids acrylic latex (Primal B-15, Rohm & Haas) and 4% melamine formaldehyde resin syrup (Beetle BT309-B.I.P. Chemicals). The impregnation and subsequent drying were carried out as described in the above patent.

The resulting dried sheet as described as below showed very little adhesion between the nylon and the active carbon/fibre layer:

Basis Weight—550 g/m2
Caliper—1.625 mm
Active Carbon Content—35% approx.
Binder—20% approx.

To this material a further application of binder was applied to they nylon surface. The binder had the same composition as above but with the addition of 0.2% of a nonionic multipurpose wetting agent (Hyonic PE9-0—Diamond Shamrock Ltd.) The application of binder consisted of flowing the binder onto a roller under which the sheet travelled. The travel of the sheet under the roller was a downward angle approaching the roller and at an upward angle away from it. Two speeds of travel of the sheet were tried at 5 f.p.m. and 10 f.p.m. The surface of the sheet took up about the same amount of binder at either speed. The presence of the wetting agent ensured that the binder penetrated the surface of the sheet completely before the sheet went on to the drying cylinders. It was found that the binder penetrated the nylon fabric completely but only part of the way through the carbon fibre layer.

An indication of the extent to which the binder penetrated the sheet is given by the fact that the total pick up of the liquid binder was 51% based on the weight of the sheet. This resulted in a total pick up of dry binder solids of 4.75%. In the original impregnation where the binder penetrated the whole sheet the total pick up of the liquid binder was 215% of the weight of the dry web resulting in a pick up of dry binder solids of 20%. This shows that the secondary binder impregnation was approximately up to a quarter of the way through the thickness of the sheet.

The sheet was again dried in the conventional manner. At this stage the adhesion of the nylon to the carbon fibre layer was considerably improved.

Further heating of the sheet for a sufficient time (e.g. at a temperature of 125° C for the three minutes or at a temperature of 105° C for about eight minutes) resulted in curing of the binder of the second application of binder. The adhesion of the nylon was now found to be completely adequate both in the dry and the wet state. AT the same time it was found that the permeability of the material to odors or sweat were not altered to any great extent.

In use in footwear the nylon surface was used uppermost.

In order to overcome the problem of the active carbon/fibre layer sticking to the insole of the shoe thus causing premature break down, the following alternatives can be used.

1. A preformed polythene foam may be laminated to the bottom surface using a polyurethane adhesive.
2. A foamed latex may be deposited on the bottom surface (bottom side up), set and heat cured. This method has the advantage that the heat can also be used to cure the binder of the second impregnation.

When foam is not required the bottom surface can be protected by the conventional lamination to it of cloth, non-woven fabric or latex impregnated board, etc. Any loss of permeability in this direction i.e. downwardly when the insole is in place in the shoe is not important.

I claim:

1. In a process of producing an air-permeable wear-resistant insole comprising the steps of
    forming a web or matt layer of fibres loaded with active carbon by amn air-laying method onto a wear-resistant fabric which is different from and has greater wear resistance than said web or matt layer
    wherein the amount of latex required to adequately bond such fabrics to the web or matt results in lowering permeability of the insole to a useless level;
    effecting a first impregnation of said web or matt layer of fibres with a latex binder and
    effecting migration of said binder from the interior of said web or matt to the surfaces thereof,
    and curing said binder by the application of heat whereby to form an air-permeable insole,
    the improvement which comprises
    improving the bonding between said web or matt and said wear-resistant fabric without lowering the permeability of the web or matt to the point where it fails to achieve its intended object, by effecting a second impregnation by coating the outer surface of said wear-resistant fabric section of said insole with a latex binder which contains a sufficient amount of wetting agent to effect a controlled penetration of said binder through said wear-resistant fabric and into the surface of the web or matt attached thereto but an insufficient amount of said wetting agejnt to cause complete penetration through to the web or matt layer and curing the said binder by the application of heat.

2. A process as claimed in claim 1 in which the amount of binder retained by the said insole from the said second impregnation is less than 5 percent by weight based on the dry weight of the finished insole.

3. A process as claimed in claim 2 in which the same latex is used to form the binder used in the first and second impregnations.

4. A process as claimed in claim 3 in which the wetting agent contained in the binder used for the second impregnation is a non-ionic wetting agent and is present in the binder in an amount of about 0.2 percent by weight.

5. A process as claimed in claim 1 wherein said fabric is nylon.

* * * * *